(12) United States Patent
Fu et al.

(10) Patent No.: US 11,789,339 B2
(45) Date of Patent: Oct. 17, 2023

(54) CAMERA DEVICE AND ELECTRONIC APPARATUS

(71) Applicant: New Shicoh Motor Co., Ltd., Zhejiang (CN)

(72) Inventors: Xuepeng Fu, Yamato (JP); Tomoyoshi Yano, Yamato (JP)

(73) Assignee: NEW SHICOH MOTOR CO., LTD, Zhejiang (CN)

( * ) Notice: Subject to any disclaimer, the term of this patent is extended or adjusted under 35 U.S.C. 154(b) by 0 days.

(21) Appl. No.: 17/846,617

(22) Filed: Jun. 22, 2022

(65) Prior Publication Data
US 2022/0413362 A1  Dec. 29, 2022

(30) Foreign Application Priority Data

Jun. 23, 2021 (CN) .......................... 202110699797.9
Jun. 23, 2021 (CN) .......................... 202110701490.8
Jun. 23, 2021 (CN) .......................... 202110701510.1

(51) Int. Cl.
*G03B 9/22* (2021.01)
*G03B 17/12* (2021.01)

(52) U.S. Cl.
CPC ............... *G03B 9/22* (2013.01); *G03B 17/12* (2013.01); *G03B 2217/002* (2013.01)

(58) Field of Classification Search
CPC .... G03B 9/22; G03B 17/12; G03B 2217/002; G03B 2205/0069; H04N 23/50; H04N 23/51
See application file for complete search history.

(56) References Cited

U.S. PATENT DOCUMENTS

| | | | | |
|---|---|---|---|---|
| 9,313,387 | B2 * | 4/2016 | Han | G03B 3/10 |
| 9,477,137 | B2 * | 10/2016 | Yamamoto | G03B 9/14 |
| 11,363,182 | B2 * | 6/2022 | Song | G03B 5/00 |
| 2011/0134303 | A1 * | 6/2011 | Jung | H04N 23/50 |
| | | | | 257/E31.127 |
| 2022/0413361 | A1 * | 12/2022 | Fu | G01B 7/003 |

FOREIGN PATENT DOCUMENTS

JP   2020-122915 A   8/2020

* cited by examiner

*Primary Examiner* — Christopher E Mahoney
(74) *Attorney, Agent, or Firm* — Hayes Soloway PC

(57) ABSTRACT

A camera device includes: a lens carrier that holds a lens body; and a blade driving device that drives a blade arranged on a front side of the lens body, wherein the lens carrier has a metallic carrier side receiving portion extending forward from a front end of the lens carrier, the blade driving device has a metallic blade side receiving portion protruding sideward or rearward from a side surface or a bottom surface of the blade driving device, and the carrier side receiving portion and the blade side receiving portion are fixed and electrically connected.

18 Claims, 11 Drawing Sheets

CAMERA DEVICE AND ELECTRONIC APPARATUS

CROSS-REFERENCE TO RELATED APPLICATIONS

This application claims the benefit of Chinese Patent Application No. 202110699797.9, No. 202110701490.8, and No. 202110701510.1, each filed Jun. 23, 2021, which is hereby incorporated by reference herein in its entirety.

TECHNICAL FIELD

The present disclosure relates to a camera device used in electronic apparatus such as smartphones, and an electronic apparatus.

BACKGROUND

Various techniques have been proposed to adjust the amount of light incident on the lens body by sliding the blades of the camera device. The optical device (camera device) disclosed in Patent Document 1 (Japanese Patent Application Laid-Open No. 2020-122915A) has a blade driving device provided on the front side of a lens barrel of a lens driving device, and the blade driving device includes two blades, two plate members sandwiching the blades from the front and rear, a coil, and a magnet for driving on a base member. This blade driving device rotates one of the two plate members with respect to the other by the electromagnetic force between the coil for blade and the magnet for driving to move the blades and adjust the amount of light incident on the lens module.

SUMMARY

However, in the optical device of Patent Document 1, a power supply terminal with a spring property is pulled out from the rear surface of the base member, the rear end of the power supply terminal is connected to a portion of the lens driving device supporting the lens barrel, and an electric current is supplied to the coil for blade from the lens driving device via the power supply terminal. Therefore, there is a risk of adversely affecting the optical characteristics of the lens held in the lens driving device. In addition, in the technique of Patent Document 1, the lens module is supported by two spring leaves, and these two spring leaves are conductive paths to the driving coil for lens and driving coil for blade. Further, the spring leaf is connected to a connection line, and the connection line is connected to a connection terminal with the outside provided on the pedestal. Therefore, there is a problem that it is necessary to provide a large number of connecting terminals with the outside to secure a necessary number of conductive paths for each coil.

The present disclosure has been made in view such a problem, and the present disclosure firstly aims to provide a camera device which hardly adversely affects the optical characteristics of the lens, and secondarily aims to provide a camera device capable of easily securing a necessary number of conductive paths for supplying electric current to the lens driving device and the blade driving device.

To achieve the above-described the first and second objects, in accordance with a first aspect of the present disclosure, there is provided a camera device including: a lens carrier that holds a lens body; and a blade driving device that drives a blade arranged on a front side of the lens body, wherein the lens carrier has a metallic carrier side receiving portion extending forward from a front end of the lens carrier, the blade driving device has a metallic blade side receiving portion protruding sideward or rearward from a side surface or a bottom surface of the blade driving device, and the carrier side receiving portion and the blade side receiving portion are fixed and electrically connected.

In accordance with a second aspect of the present disclosure, there is provided an electronic apparatus including the camera device described above.

Further features of the present invention will become apparent from the following description of exemplary embodiments (with reference to the attached drawings).

DETAILED DESCRIPTION OF THE DRAWINGS

Figure 1:
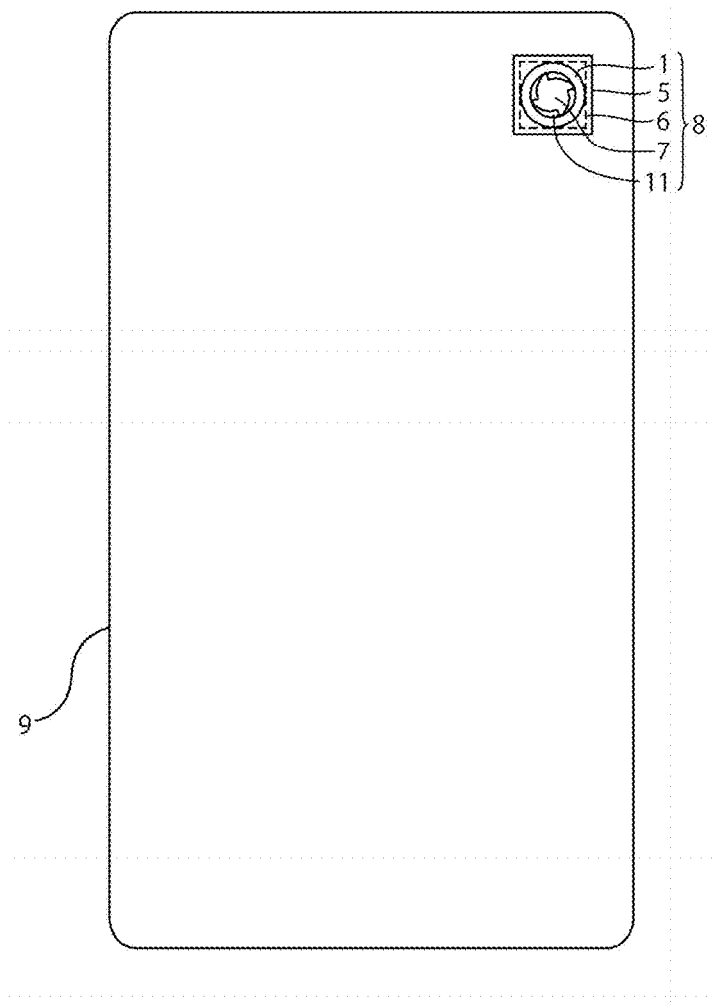
FIG. 1 is a front view of a smartphone on which a camera device is mounted, the camera device including a blade driving device and a lens driving device according to one embodiment of the present disclosure.

Hereinafter, embodiments of the present disclosure are explained with reference to drawings. As shown in FIG. 1, a camera device 8 according to one embodiment of the present disclosure is accommodated in a smartphone 9.

The camera device 8 includes: a lens body 7; blades 11 arranged on the front side (+Z side) of the lens body 7; an image sensor 6 that converts light from the lens body 7 into an electrical signal; a lens driving device 5 that drives the lens body 7; and a blade driving device 1 that drives the blades 11.

Hereinafter, as shown in FIGS. 2 to 11, the direction in which the light from the subject is incident is appropriately referred to as a Z direction, one direction orthogonal to the Z direction is appropriately referred to as an X direction, and a direction orthogonal to both the Z direction and the X direction is appropriately referred to as a Y direction. Further, the +Z side of the optical axis of the lens body 7, which is the side of the subject, may be referred to as a front side, and the −Z side, which is the side on which the image sensor 6 on the opposite side of the subject is provided, may be referred to as a rear side. In addition, the +X side may be referred to as an upper side, the −X side may be referred to a lower side, the +Y side may be referred to as a left side, and the −Y side may be referred to a right side.

Figure 3:
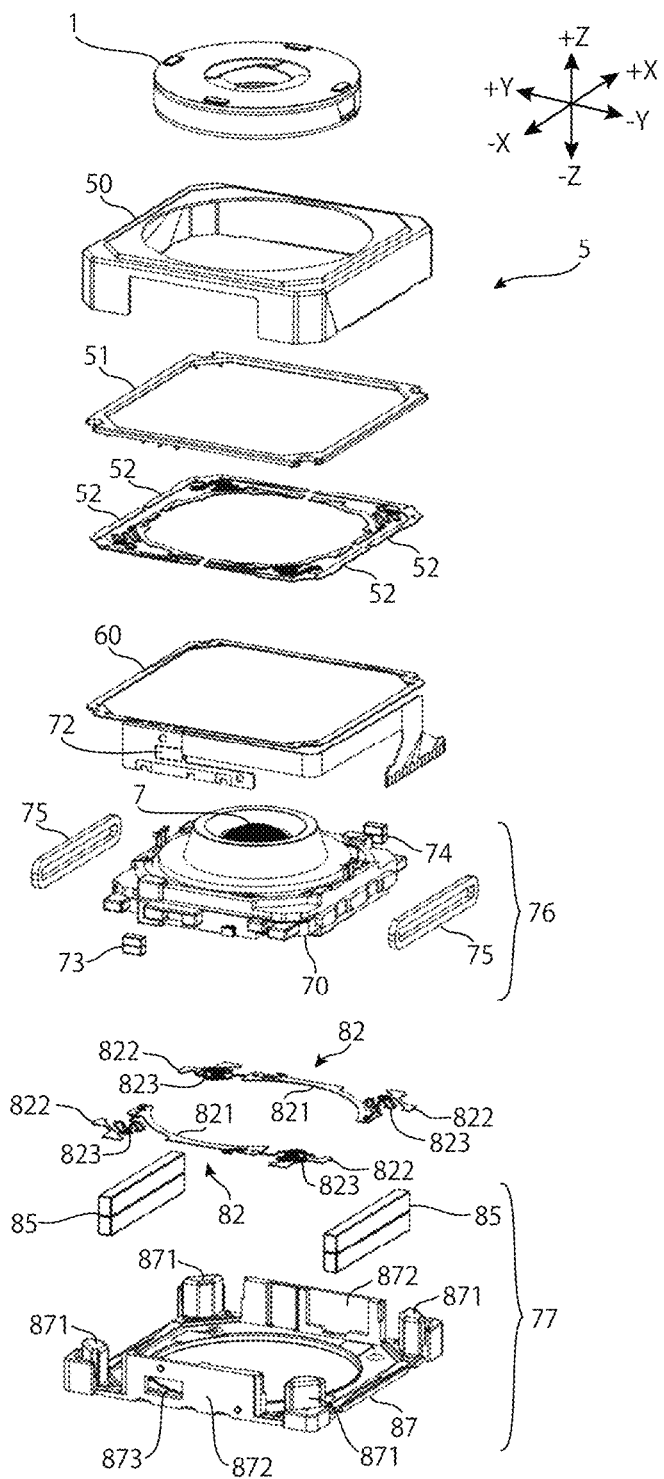
FIG. 3 is an exploded perspective view of the blade driving device shown in FIG. 2.

As shown in FIG. 3, the lens driving device 5 includes a first cover 50, a spacer 51, four front side leaf springs 52, an FPC (Flexible printed circuit board) 60, a lens carrier 70, a first Hall IC (Hall integrated circuit) 72, a position detecting magnet 73, a balancer 74, first coils 75, two rear side leaf springs 82, first magnets 85, and a first base 87. In the present embodiment, the lens carrier 70 which is a movable portion moves in the Z direction with respect to the first base 87 which is a fixed portion. The first magnets 85, the FPC 60, the first Hall IC 72 and the first cover 50 are attached to the first base 87 to form a large fixed portion 77. The first coils 75, the position detecting magnet 73, the balancer 74 are attached to the lens carrier 70 to form a large movable body 76. Further, the lens body 7 and the blade driving device 1 are also attached to the lens carrier 70. They move together with the lens carrier 70 in the Z direction.

Figure 4:
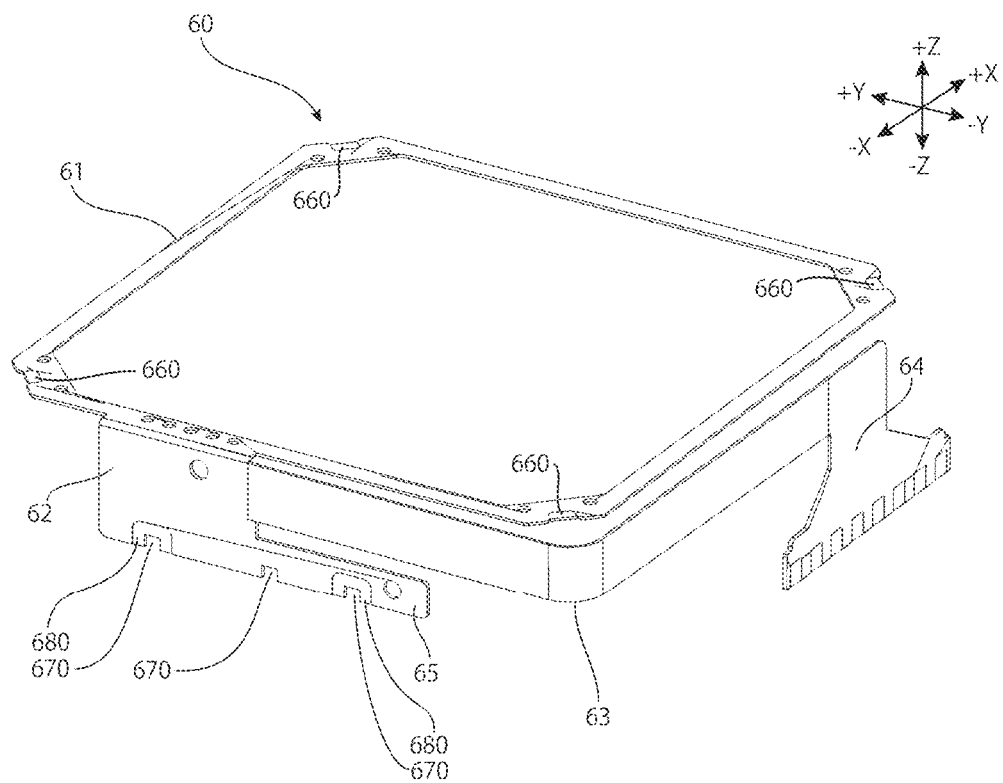
FIG. 4 is a perspective view of the flexible printed circuitboard (FPC) 60 illustrated in FIG. 3.

As shown in FIG. 4, the FPC 60 has an external terminal connecting portion 64 to be connected to the outside of the lens driving device 5 at one end, a flat plate portion 62 at the other end, and an internal path portion 61 at one of other ends. A portion of the flat plate portion 62 belongs to one of the other ends (the internal path portion 61), and a portion belongs to the other of the other ends (a protruding portion 65). A strip-like portion 63 extending along the outer periphery of the lens driving device 5 is connected between external terminal connecting portion 64 and the flat plate portion 62. The lens driving device 5 and the blade driving device 1 are electrically connected to the outside via the FPC 60.

A connecting terminal with the outside is provided at the rear end of the external terminal connecting portion 64. The strip-like portion 63 extends in the −X direction from the front side portion of the external terminal connecting portion 64, changes the direction to extend in the +Y direction at the corner on the −X−Y side of the lens driving device 5, and reaches an edge of the flat plate portion 62. The flat plate portion 62 is fixed to the side wall portion 872 (see FIG. 3) of the first base 87 which will be described later. The internal path portion 61 extends out from a portion on the +Z side of the flat plate portion 62. The internal path portion 61 is formed in a quadrangular frame shape, and lands 660 are formed at four corner portions. A portion on the −Z side of the flat plate portion 62 protrudes to the −Y side as a protruding portion 65 belonging to the other of the other ends. Three notches 670 are provided at the end sides on the −Z side of the flat plate portion 62. Among the three notches, the notches 670 on the +Y side and the −Y side are provided with lands 680. In addition, the first Hall IC 72 (see FIG. 3) which will be described later is fixed to the inner surface of the flat plate portion 62 at the other of the other ends.

Figure 2:
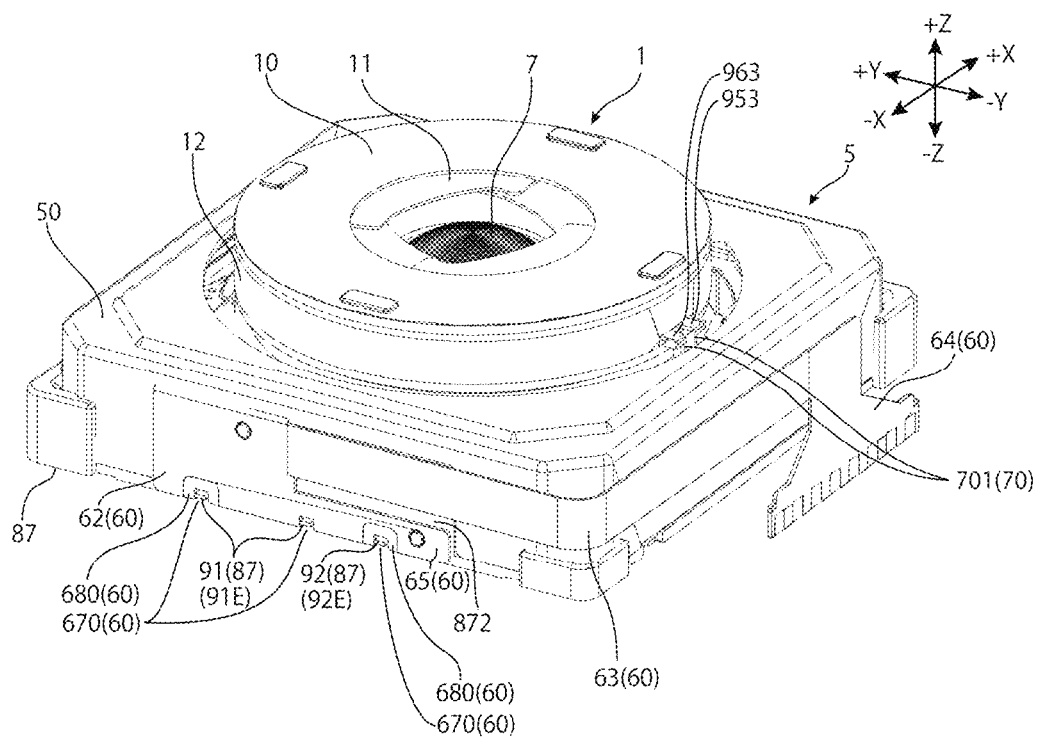
FIG. 2 is a perspective view of the blade driving device and the lens driving device shown in FIG. 1.

As shown in FIG. 2, the first base 87 and the first cover 50 are combined as a housing. The image sensor 6 is fixed to the rear surface of the first base 87.

The lens carrier 70 is accommodated in the housing. As shown in FIG. 3, the blade driving device 1 is mounted on the front side of the lens carrier 70. The blade driving device 1 is exposed forward from a through hole of the first cover 50, as shown in FIG. 2.

Figure 5:
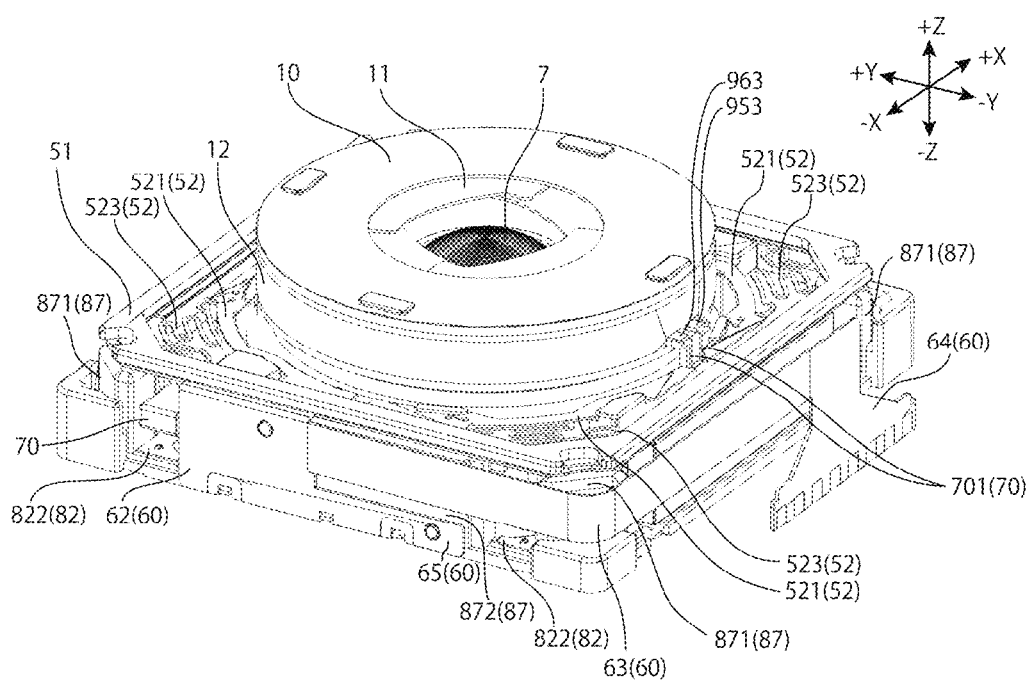
FIG. 5 is a perspective view in which the first cover is removed from the blade driving device shown in FIG. 2.

The lens carrier 70 holds the lens body 7 and moves at least in the optical axis direction of the lens body 7. As shown in FIG. 5, respective pairs of metallic carrier side receiving portions 701 are located at respective positions of the front surface of the lens carrier 70 on the +Y side and the −Y side sandwiching the lens body 7.

Figure 8:
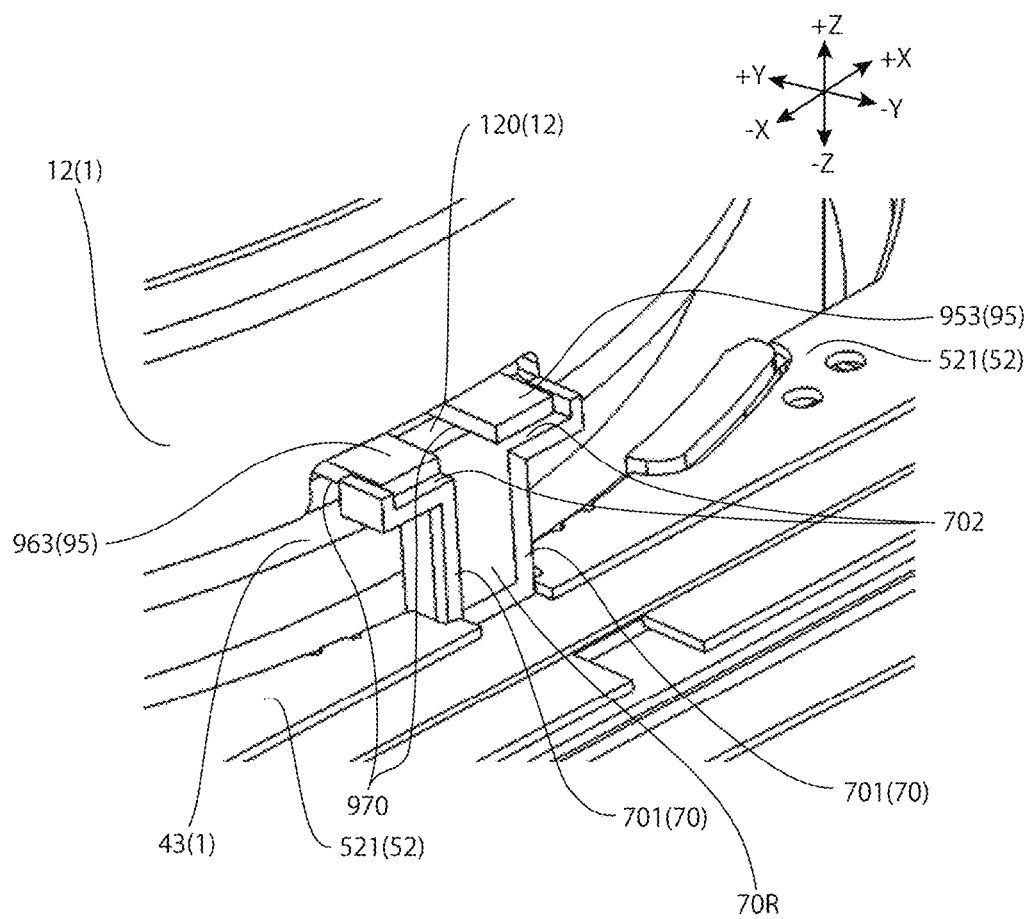
FIG. 8 is an enlarged view of the periphery of the junction portions between the carrier side receiving portions and the blade side receiving portions and shown in FIG. 5.

As shown in the partial enlarged view of FIG. 8, the carrier side receiving portions 701 are integrally formed with the lens carrier 70 by insert molding. In a pair of carrier side receiving portions 701, two plate-like members re slightly separated and face each other on the +X side and the −X side. Resin 70R constituting the main body of the lens carrier 70 is filled between the pair of carrier side receiving portions 701. The pair of carrier side receiving portions 701 extend forward from the front surface of the lens carrier 70, bend and spread at right angle in a direction in which the front end portions are separated from each other, and form first surfaces 702 on the front side. The extended tip end portion of the first surface 702 extends further forward.

As shown in FIGS. 2 and 3, the first base 87 is a plate-like member having a quadrangular outer shape and is provided with a through hole in the center. The first base 87 is insert-molded in a state where the main body of the first base 87 is made of resin, and a first metal member 91, a second metal member 92, and a third metal member (not shown) are embedded in the resin. The three metal members are rectangular as a whole and extend along four sides of the first base 87. The first metal member 91 and the second metal member 92 have side surface exposed portions 91E, 92E exposed to the outside of the side surface on the −X side of the first base 87. In addition, the first metal member 91 and the second metal member 92 have front surface exposed portions exposed on the front surface.

As shown in FIG. 3, FIG. 5, FIG. 6 and FIG. 7, there are column portions 871 at the four corners of the first base 87. There are side wall portions 872 at the end sides on the −X side and the +X side of the first base 87. As shown in FIG. 3, the side wall portion 872 on the −X side is provided with a rectangular opening portion 873.

Figure 7:
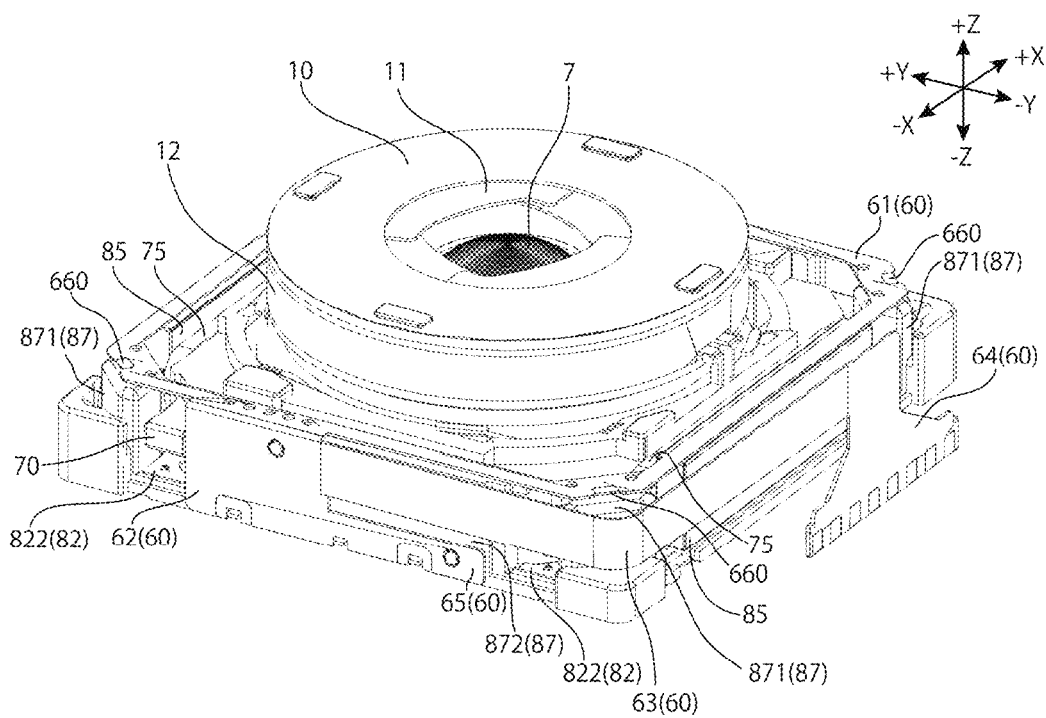
FIG. 7 is a perspective view in which the front side leaf 52 is removed from the blade driving device in FIG. 6.

As shown in FIG. 3 and FIG. 7, the first coils 75 are wound on an axis along the Y direction about the protruding portions of the side surfaces on the +Y side and the −Y side of the lens carrier 70. The first magnets 85 are fixed to the front surfaces of the edge portions on the +Y side and the −Y side of the first base 87 so as to face the first coils 75. The first magnet 85 has two magnet pieces aligned in the Z direction, and is magnetized so that the magnetic pole on the side facing the first coil 75 and the magnetic pole on the opposite side become mutually reverse magnetic poles. In addition, the magnetization directions of the two magnet pieces are opposite.

Figure 6:
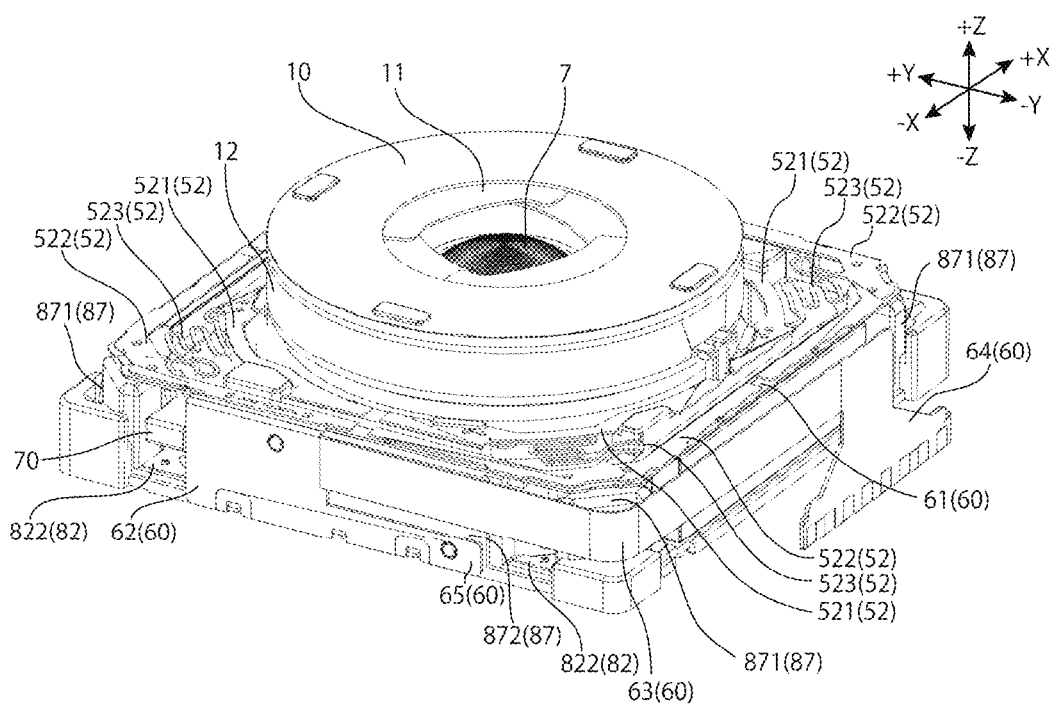
FIG. 6 is a perspective view in which the spacer is removed from the blade driving device shown in FIG. 5.

The front side leaf spring 52 is divided into four leaf spring pieces on the +X+Y side, the +X−Y side, the −X+Y side and the −X−Y side to be electrically separated, and has a quadrangular shape as a whole. As shown in FIGS. 5 and 6, each leaf spring piece of the front side leaf spring 52 has an inner side portion 521, an outer side portion 522, and an arm portion 523 elastically connecting the inner side portion 521 and the outer side portion 522. The rear side leaf spring 82 is divided into two leaf spring pieces on the +X side and the −X side to be electrically separated, and has a quadrangular shape as a whole. Each leaf spring piece of the rear side leaf spring 82 has an inner side portion 821, two outer side portions 822, and two arm portions 823 elastically connecting the inner side portion 821 and the two outer side portions 822, as shown in FIG. 3.

The lens carrier 70 is supported in the air by the front side leaf spring 52 and the rear side leaf spring 82. The four inner side portions 521 of the front side leaf spring 52 are fixed to the peripheral edge portion on the front side of the lens carrier 70, respectively. As shown in FIG. 8, the inner side portion 521 on the +X−Y side and the inner side portion 521 on the −X−Y side are arranged so as to be in contact with the base portions of the two carrier side receiving portions 701 on the −Y side of the lens carrier 70, respectively, and are electrically connected by soldering or the like. Similarly, the inner side portion 521 on the +X+Y side and the inner side portion 521 on the −X+Y side are also arranged so as to be in contact with the base portions of the two carrier side receiving portions 701 on the +Y side of the lens carrier 70, respectively, and are electrically connected by soldering or the like.

The two inner side portions 821 of the rear side leaf spring 82 are fixed to the peripheral edge portion on the rear side of the lens carrier 70. As shown in FIG. 3, FIG. 5, FIG. 6 and FIG. 7, the four outer side portions 822 of the rear side leaf spring 82 are fixed to the portions of the front surface of the first base 87 on the inner sides of the column portions 871.

As shown in FIGS. 6 and 7, the internal path portion 61 of the FPC 60 is arranged on the rear side of the four outer side portions 522 of the front side leaf spring 52, and the outer side portions 522 and the lands 660 are electrically connected by soldering or the like. As shown in FIGS. 5 and 6, a quadrangular frame-shaped spacer 51 is fixed to the front side of the outer side portions 522, and the spacer 51 is fixed to the rear surface of the front side wall of the first cover 50. The four outer side portions 522 of the front side leaf spring 52 extend in the X direction and the Y direction with the same width as the internal path portion 61 and the spacer 51, respectively and these three extend closely along the outer shape of the first cover 50.

As shown in FIG. 3, the first Hall IC 72 is fixed to the inner surface of the flat plate portion 62. The first Hall IC 72 is a magnetic position sensor. Six lands are provided at a position of the FPC 60 where the first Hall IC 72 is fixed. The six lands of the FPC 60 are electrically connected to six pads of the first Hall IC 72. Among the six lands of the FPC 60, four lands are connected to the external terminal connecting portion 64. And the remaining two lands are connected to the lands 680, respectively.

The first Hall IC 72 is accommodated in the opening portion 873 of the side wall portion 872 on the −X side of the first base 87. The position detecting magnet 73 is fixed to a position opposing the first Hall IC 72 on the side surface on the −X side of the lens carrier 70. The balancer 74 is fixed to the side surface on the +X side of the lens carrier 70. The balancer 74 is for weight balancing with the position detecting magnet 73.

As shown in FIG. 2, the side surface exposed portions 91E, 92E of the first metal member 91 and the second metal member 92 are exposed to the outside of the surface of the first base 87 on the −X side from the portions of the notches 670 of the FPC 60. The side surface exposed portion 91E on the +Y side of the two side surface exposed portions 91E of the first metal member 91 is soldered to the land 680 on the +Y side, and the side surface exposed portion 92E of the second metal member 92 is soldered to the land 680 on the −Y side.

The front surface exposed portion of the first metal member 91 is exposed on the inner side the column portion 871 on the −X+Y side of the front surface of the first base 87, and is soldered to the outer side portion 822 of the rear side leaf spring 82 on the −X side. One end portion of the first coils 75 on the +Y side and the −Y side are electrically connected to the inner side portion 821 of the rear side leaf spring 82 on the −X side, respectively.

The front surface exposed portion of the second metal member 92 is exposed on the inner side of the column portion 871 on the +X−Y side of the front surface of the first base 87, and is soldered to the outer side portion 822 of the rear side leaf spring 82 on the +X side. The other end portions of the first coils 75 on the +Y side and the −Y side are electrically connected to the inner side portion 821 of the rear side leaf spring 82 on the +X side, respectively.

When an electric current is supplied to the first coil 75, an electromagnetic force is generated in the first coil 75 by the magnetic field of the first magnet 85, and a thrust force in the Z direction is produced. By this thrust force, the lens carrier 70 holding the lens body 7 and the blade driving device 1 supported on the front side thereof move in the Z direction against the elastic force of the front side leaf spring 52 and rear side leaf spring 82. When the supply of electric current to the first coil 75 is stopped, the lens body 7, the lens carrier 70 and the blade driving device 1 will return to their original positions.

The first Hall IC 72 detects the magnetic field of the opposing position detecting magnet 73, and outputs the electric current for driving the first coil 75 based on the detection result. This magnetic field corresponds to the position of the position detecting magnet 73 in the Z direction with respect to the first Hall IC 72.

Figure 9:
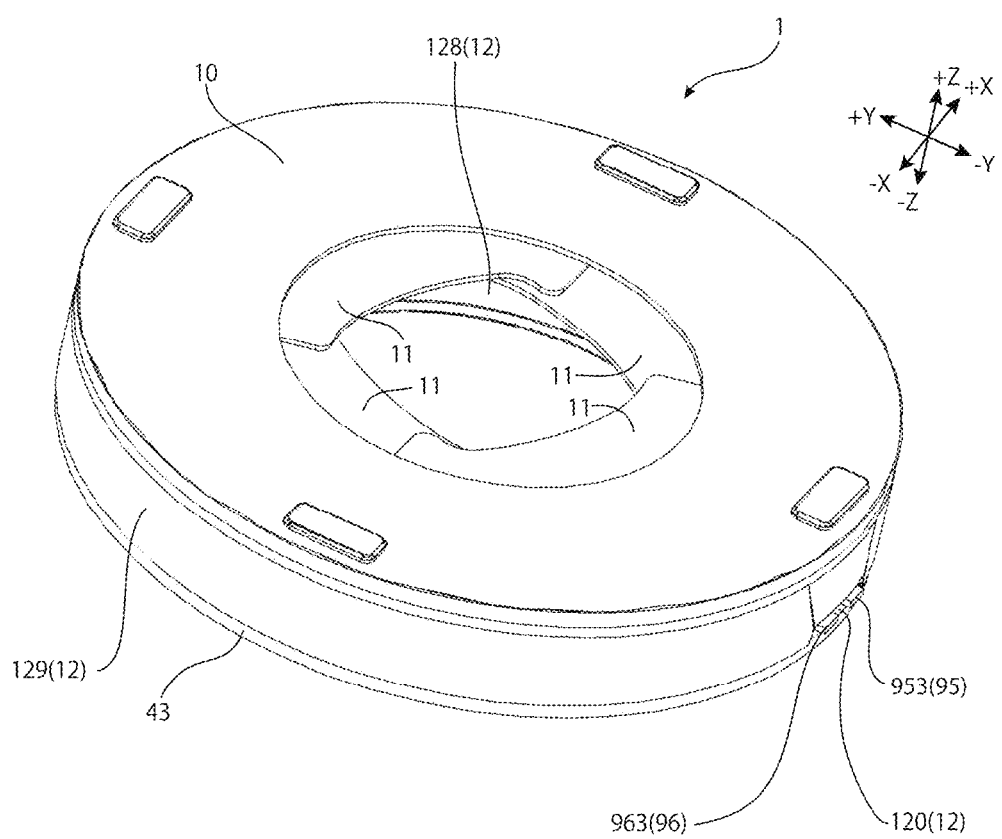
FIG. 9 is a perspective view of the blade driving device shown in FIG. 2.
Figure 10:
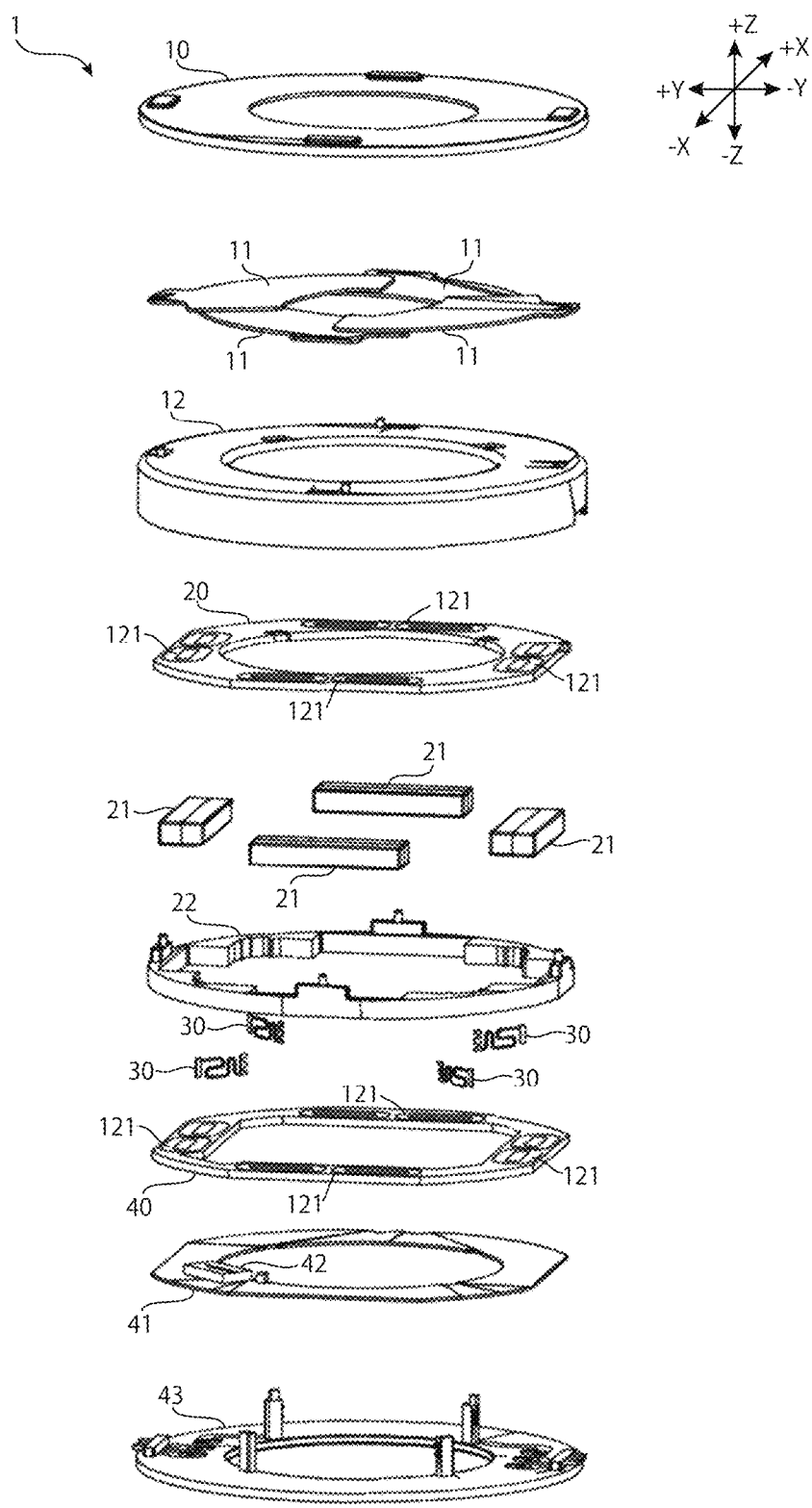
FIG. 10 is an exploded perspective view of the blade driving device shown in FIG. 9.

As shown in FIG. 9 and FIG. 10, the blade driving device 1 includes a second cover 10, four blades 11, a fixed plate 12, a front side coil substrate 20, four second magnets 21, a movable ring 22, four leaf springs 30, a rear side coil substrate 40, a circuit board 41, a second Hall IC 42 and a second base 43.

In the blade driving device 1, the circuit board 41 is overlapped and fixed to the front side of the second base 43, and further, the rear side coil substrate 40 is overlapped and fixed to the front side thereof. In addition, the second magnets 21 are fixed to the inside of the movable ring 22. The movable ring 22 is rotatably supported by the column portions rising on the inner peripheral side of the second base 43 via the leaf springs 30. The front side coil substrate 20 is fixed to the fixed plate 12 from the rear side, and the fixed plate 12 is fixed to the second base 43 so as to cover the second base 43. The four blades 11 are attached to the front side of the fixed plate 12 so as to be connected to the movable ring 22, and as shown in FIG. 9, an aperture is formed in the center of the four blades 11. The blades 11 are operated so as to change the size of the aperture by the rotation of the movable ring 22. Further, the second cover 10 is provided so as to cover the outer side portions of the blades 11.

The second Hall IC 42 for detecting the position of the second magnet 21 is provided on the circuit board 41. In addition, the second coils 121 are embedded in the front side coil substrate 20 and the rear side coil substrate 40, and the second coils 121 sandwich the second magnets 21 from the front and rear. When an electric current flows in the second coil 121, an electromagnetic force is generated in the second coil 121 by the magnetic field of the second magnet 21, and the movable ring 22 on which the second magnet 21 is mounted is rotated by the reaction.

Figure 11:
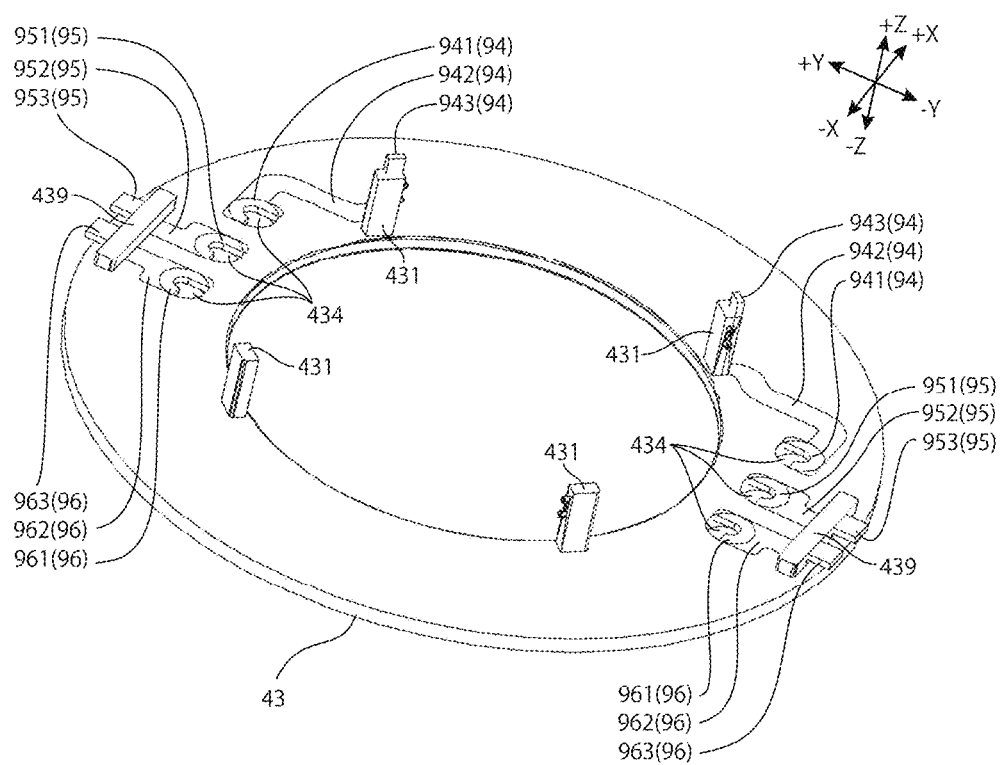
FIG. 11 is a perspective view showing the second base shown in FIG. 10.

As shown in FIG. 11, the second base 43 is insert-molded with the main body of the second base 43 made of resin, and two fourth metal members 94, two fifth metal members 95 and two sixth metal members 96 embedded in the resin.

The second base 43 is formed in an annular shape. Column portions 431 rising on the +Z side are provided on the +X+Y side, the +X−Y side, the −X+Y side and the −X−Y side of the inner peripheral edge surrounding the central through hole in the second base 43. Every three holes 434 are provided on the +Y side and the −Y side of the second base 43, respectively. The three holes 434 are aligned in the X direction.

Each of the fourth metal members 94 has an exposed portion 941 exposed in a hook-like shape in the front and rear in the hole 434 on the +X side, an embedded portion 942 protruding from the exposed portion 941 to the +X side in an embedded state and extending to the nearest column portion 431 while bending, and a rising portion 943 rising at the column portion 431 and extending forward along the column portion 431. The front end portion of the rising portion 943 protrudes to the tip of the front edge of the column portion 431 and is exposed.

Each of the fifth metal members 95 has an exposed portion 951 exposed in a hook-like shape in the front and rear in the middle hole 434, an embedded portion 952 extending from the exposed portion 951 toward the outer periphery side in an embedded state, and a blade side receiving portion 953 rising in a stepped shape at the tip end of the embedded portion 952 and then projecting outside the outer edge of the second base 43.

Each of the sixth metal members 96 has an exposed portion 961 exposed in a hook-like shape in the front and rear in the hole 434 on the −X side, an embedded portion 962 extending from the exposed portion 961 toward the outer periphery side in an embedded state, and a blade side receiving portion 963 rising in a stepped shape at the tip end of the embedded portion 962 and then projecting outside the outer edge of the second base 43.

The rising portions of the blade side receiving portions 953 and 963 are covered by a laterally long slender plate portion 439 in the X direction, and the blade side receiving portions 953 and 963 project outward from the side surface of the slender plate portion 439.

The four exposed portions 951, 961 are electrically connected to the second Hall IC 42 via the circuit board 41. One of the output electric currents of the second Hall IC 42 is supplied from the circuit board 41 to the second coil 121 of the rear side coil substrate 40. The other of the output electric currents of the second Hall IC 42 flows from the circuit board 41 to the fourth metal member 94 via the exposed portion 941, and is electrically connected to the second coil 121 of the front side coil substrate 20 at the front end portion of the rising portion 943.

As shown in FIG. 8, the blade side receiving portions 953 and 963 protruding from the notches 120 on the +Y side and the −Y side of the blade driving device 1 has a shape in which the surfaces facing the front and rear directions become plate surfaces, and the second surfaces 970 which are the rear surfaces are placed on the first surfaces 702 of the two carrier side receiving portions 701 on the +Y side and the −Y side of the lens carrier 70, respectively. The carrier side receiving portions 701 and the blade side receiving portions 953 and 963 are fixed and electrically connected by welding or soldering. By providing such first surfaces 702 and second surfaces 970, the carrier side receiving portions 701 can stably receive blade side receiving portions 953, 963.

The above is the details of the present embodiment. The camera device 8 according to the present embodiment includes a lens carrier 70 that holds the lens body 7, and a blade driving device 1 that drives blades 11 arranged on the front side of the lens body 7, wherein the lens carrier 70 has metallic carrier side receiving portions 701 extending forward from the front end of the lens carrier 70 as shown in FIG. 8, the blade driving device 1 has metallic blade side receiving portions 953 and 963 protruding sideward from the side surface of the blade driving device 1 as shown in FIG. 11, and the carrier side receiving portions 701 and the blade side receiving portions 953 and 963 are fixed and electrically connected. Thus, since the blade driving device 1 is fixed to the lens carrier 70 other than the lens body 7, it is possible to provide a camera device 8 hardly adversely affects the optical characteristics of the lens.

In addition, the camera device 8 of the present embodiment includes a lens driving device 5 and a blade driving device 1. As shown in FIG. 6, the lens driving device 5 includes: a lens carrier 70 that holds the lens body 7; a front side leaf spring 52 that has an inner side portion 521 fixed to the lens carrier 70, an outer side portion 522 fixed to the fixed portion arranged on the outer side of the lens carrier 70, and an arm portion 523 connecting the inner side portion 521 and the outer side portion 522; and an FPC 60 having one end connected to an outside of the lens driving device 5. The blade driving device 1 is attached to the lens carrier 70 to drive the blades 11 arranged on the front side of the lens body 7. One of the other ends of the FPC 60 is electrically connected to the outer side portion 522 of the front side leaf spring 52, the inner side portion 521 of the front side leaf spring 52 is electrically connected to the blade driving device 1, and the other of the other ends of the FPC 60 is used to drive the lens carrier 70. One FPC 60 is used, one end is for external connection, one of the other ends is for the blade driving device, and the other is for the lens carrier, so that it is easy to provide one for external connection. Thus, it is possible to provide a camera device 8 capable of easily securing a necessary number of conductive paths for supplying electric current to the lens driving device 5 and the blade driving device 1.

It is to be noted that in the embodiment described above, the blade side receiving portions 953 and 963 may protrude rearward from the bottom surface of the blade driving device 1. Even in that case, the second surface 970 may be provided.

In addition, the second coils 121 may be fixed to the movable ring 22, and the second magnets 21 may be fixed to the fixed plate 12 or the second base 43. In that case, power may be supplied to the second coils 121 from the rising portions 943 of the fourth metal members 94 via the leaf spring 30.

In addition, for example, when power is supplied to the second coils 121 from the outside of the blade driving device 1 without providing the second Hall IC 42, four blade side receiving portions 953, 963 can be two, and the number of the carrier side receiving portions 701 can be two. In that case, the division number of the front side leaf spring 52 may also be two, and the two inner side portions of the front side leaf spring 52 may be electrically connected to the two carrier side receiving portions 701, and the two outer side portions of the rear side leaf spring 82 may be electrically connected to the outside via the FPC 60.

In addition, in the embodiment described above, the second coils 121 may be fixed to the movable ring 22, and the second magnets 21 may be fixed to the fixed plate 12 or the second base 43. In that case, power may be supplied to the second coils 121 from the rising portions 943 of the fourth metal members 94 via the leaf spring 30.

In addition, the FPC 60 may extend at only the internal path portion 61 without providing a land 680 on the flat plate portion 62, and a second flat plate portion may be provided on the −Z side in the middle of the extension of the internal path portion 61, and the land 680 may be provided on this second flat plate portion. In addition, the internal path portion 61 is not necessary to be provided in a frame shape (annular shape), for example, there may be no side portion on the +X side. Further, when the two lands 660 on the +X side are not required, only the two lands 680 on the −X side and the side portion on the −X side may be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A camera device, comprising:
   a lens carrier that holds a lens body; and
   a blade driving device that drives a blade arranged on a front side of the lens body,
   wherein the lens carrier has a metallic carrier side receiving portion extending forward from a front end of the lens carrier, the blade driving device has a metallic blade side receiving portion protruding sideward or rearward from a side surface or a bottom surface of the blade driving device, and the carrier side receiving portion and the blade side receiving portion are fixed and electrically connected.

2. The camera device according to claim 1, wherein the carrier side receiving portion is integrally formed with the lens carrier by insert molding.

3. The camera device according to claim 1, wherein the blade side receiving portion is integrally formed with the blade driving device by insert molding.

4. The camera device according to claim 1, wherein a first surface facing forward is formed at a tip end of the carrier side receiving portion, a second surface facing rearward is formed at a tip end of the blade side receiving portion, and the second surface is placed on the first surface.

5. The camera device according to claim 4, wherein in the carrier side receiving portion, two plate-like members are slightly separated and opposes each other, and the first surfaces are formed to extend in a direction separated from each other.

6. The camera device according to claim 5, wherein an extended tip end portion of the first surface extends further forward.

7. The camera device according to claim 5, wherein resin constituting the main body of the lens carrier is filled between the two plate-like members.

8. The camera device according to claim 1, comprising a front side leaf spring for supporting the lens carrier, wherein the front side leaf spring is arranged so as to be in contact with a proximal portion of the carrier side receiving portion, and is fixed to the lens carrier and electrically connected to the carrier side receiving portion.

9. The camera device according to claim 1, comprising a lens driving device, wherein the lens driving device includes: the lens carrier; a conductive front side leaf spring having an inner side portion fixed to the lens carrier, an outer side portion fixed to a fixed portion arranged the outside of the lens carrier, and an arm portion connecting the inner side portion and the outer side portion; and an FPC having one end connected to the outside of the lens driving device, the blade driving device is attached to the lens carrier to drive the blade arranged on the front side of the lens body, one of the other ends of the FPC is electrically connected to the outer side portion of the front side leaf spring, and the inner side portion of the front side leaf spring is electrically connected to the blade driving device, the other of the other ends of the FPC is used to drive the lens carrier.

10. The camera device according to claim 9, wherein one of the other ends of the FPC has an internal path portion provided in the lens driving device, and a land to be electrically connected to the outer side portion is provided at a predetermined position of the internal path portion.

11. The camera device according to claim 10, wherein the front side leaf spring is divided into a plurality of electrically separated front side leaf spring pieces, each of the front side leaf spring pieces has the inner side portion, the outer side portion and the arm portion, and each outer side portion is electrically connected to the internal path portion.

12. The camera device according to claim 11, wherein the internal path portion is formed in a quadrangular frame shape, and the land is formed at each corner portion of the quadrangle.

13. The camera device according to claim 10, wherein the fixed portion is provided with a placing portion for placing the internal path portion, and the land is placed on the placing portion.

14. The camera device according to claim 10, wherein the FPC has a strip-like portion extending along an outer periphery of the lens driving device from the one end, and a flat plate portion fixed to the fixed portion at the other end side of the strip-like portion, the internal path portion extends from the flat plate portion on a side orthogonal to a direction in which the strip-like portion located at one of the other ends extends.

15. The blade driving device according to claim 14, wherein a Hall integrated circuit is provided on an inner surface located at the other of the other ends of the flat plate portion, the fixed portion is provided with a space in which the Hall IC is accommodated, and the Hall IC detects a position of the lens carrier and supplies an electric current to a coil provided in the lens carrier.

16. The camera device according to claim 15, wherein the fixed portion has a base in which a metal member is embedded, the metal member has a front surface exposed portion exposed on a front surface of the base and a side surface exposed portion exposed on a side surface, the front surface exposed portion is electrically connected to the rear side leaf spring electrically connected to the coil, and the side surface exposed portion is electrically connected to the Hall IC via the land of the FPC.

17. The camera device according to claim 9, wherein the lens carrier is provided with a carrier side receiving portion, and the blade driving device is provided with a blade side receiving portion electrically connected to the carrier side receiving portion,
   the inner side portion is electrically connected to the carrier side receiving portion, so that the blade driving device is electrically connected to the FPC electrically connected to the outside.

18. An electronic apparatus comprising the camera device according to claim 1.

* * * * *